Aug. 5, 1958
E. R. PRICE
2,845,903
FLUID PRESSURE SERVO-MOTOR
Filed April 30, 1956
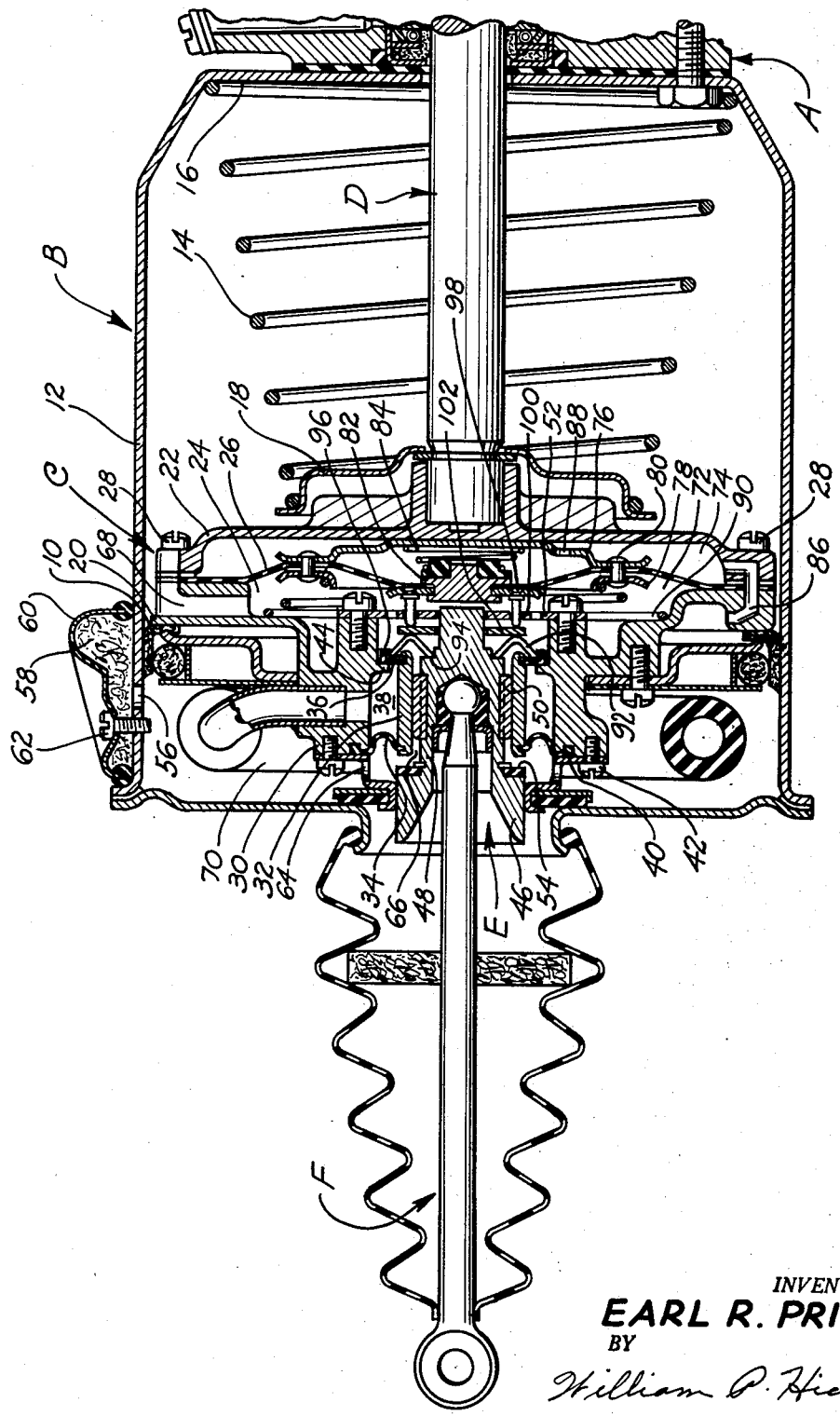
INVENTOR.
EARL R. PRICE
BY
William P. Hickey
ATTORNEY.

United States Patent Office 2,845,903
Patented Aug. 5, 1958

2,845,903

FLUID PRESSURE SERVO-MOTOR

Earl R. Price, South Bend, Ind., assignor to Bendix Aviation Corporation, South Bend, Ind., a corporation of Delaware Application April 30, 1956, Serial No. 581,436

6 Claims. (Cl. 121—46.5)

The present invention relates to valves generally, and more particularly to valves of the type to be used in fluid pressure servo-motors and the like.

An object of the present invention is the provision of new and improved valving for servo-motors and the like having a valve seat and a valve closure member movable relative to each other and in which a reaction member urges the valve members together to help effect a valve seal.

Another object of the invention is the provision of new, and improved servo-motors having valving of the above described type and which is inexpensive to manufacture, rugged in its construction, and efficient in its operation.

A more particular object of the invention is the provision of a new and improved valve structure for servo-motors and the like comprising a movable valve control member and a valve closure member in spaced relationship, an abutment member bearing against the valve control member and the valve closure member at spaced points and adapted to force the valve closure member against a valve seat, and reaction means arranged to provide a reactive force varying generally as a predetermined function of the output pressure of said valve structure, said reaction means bearing against the abutment member intermediate said spaced points.

The invention resides in certain constructions, and combinations, and arrangements of parts; and further objects and advantages will become apparent to those skilled in the art to which the invention relates from the following description of the preferred embodiment described with reference to the accompanying drawing forming a part of this specification, and in which:

The single figure of the drawing is a cross-sectional view of a pneumatic fluid pressure servo-motor embodying principals of the present invention.

Referring to the drawing, there is shown a power operated master cylinder of a type adapted to operate the brakes of an automotive vehicle. The unit generally comprises a hydraulic master cylinder A (of well known construction as disclosed in application Serial No. 513,514, and only a portion of which is shown) attached to one end of a vacuum powered fluid pressure servo-motor B, containing a power piston C adapted to receive one end of the fluid displacement member D and force it into the master cylinder A. Operation of the unit is controlled by valve structure E mounted upon the piston C; which valve structure is in turn actuated by the foot pedal lever (not shown) of the vehicle through push rod F.

The vacuum powered fluid pressure servo-motor B is an atmospheric submerged unit in which atmospheric pressure normally exists on both sides of its power piston C; and in which actuation of the piston C is accomplished by admitting vacuum to its rearwardly positioned side. The outer edge of piston C is provided with a pneumatic seal 10 slidably engaging the side walls 12 of the servo-motor, and the piston C is biased to its normal brake releasing forward position shown in the drawing by means of a coil spring 14 positioned between the rearward end 16 of the servo-motor and a spring abutment plate 18 suitably affixed to the fluid displacement member D.

Power piston C is formed in front and rear sections 20 and 22, respectively, to provide an internal piston or diaphragm chamber 24 containing a diaphragm 26 the outer edges of which are clamped between sections 20 and 22 as by machine screws 28. The front section 20 of the piston C is provided with a forwardly extending annular boss 30 which houses the previously referred to control valve structure E.

The valve structure E comprises an annular sleeve-like member 32 positioned within the annular boss 30 and having radially outwardly extending flange portions 34 and 36 adjacent its opposite ends—which flange portions engage the boss 30 to form an annular vacuum chamber 38. The front flange portion 34 is made from a flexible rubber material vulcanized onto the annular sleeve 32; and the radially outer edge of the flange 34 is sealingly clamped to the front face of the boss 30 by means of a retaining plate 40 and machine screws 42. The rear flange portion 36 is made from a stiff rubber coated metal ring suitably affixed to the sleeve 32; and the outer edges of the flange 36 are adapted to bear against the rear face of an annular valve seat 44 projecting radially inwardly from the side edges of the boss 30.

The valve structure E also comprises an axially movable generally cylindrically shaped control member 46 which extends through the sleeve 32 and which is suitably affixed to the push rod F for actuation thereby. The center portion 48 of the controlling member 46 is considerably smaller than the opening through the annular sleeve 32 to provide for the free passage of air therebetween; and a plurality of removable keys or projections 50 are provided to center the sleeve 32 with respect to the control member 46. The control member 46 is in turn supported at its forward and rearward ends by means of retaining plate 40 and guide plate 52, respectively, and the flow of air between the members is controlled by engagement of a shoulder 54 on the control member 46 with the forward end of the annular sleeve-like member 32.

Atmospheric pressure is continually fed to the front side of the piston C through opening 56 in the side wall 12. Filter material 58 is supported over the opening 56 by means of retaining plate 60 and machine screw 62 to prevent the entrance of dirt and water to the servo-motor. Shoulder 54 is normally maintained forwardly of the sleeve 32 to permit air pressure from the front side of the piston to flow through opening 64 in the retaining plate 40, annular space 66 of the control valve structure, internal diaphragm chamber 24 and piston passageway 68 to reach the rear side of the piston C, thereby establishing the normal atmospheric suspended condition of the servo-motor. Actuation of the servo-motor is produced by depressing the foot pedal lever of the automotive vehicle, whereupon shoulder 54 is forced into engagement with the annular sleeve 32 to close off atmospheric communication between opposite sides of the piston C. Vacuum is continually supplied to the annular vacuum chamber 38 from a point outside the servo-motor by means of flexible tube 70, and continued inward movement of the valve control member 46 relative to the piston C causes annular sleeve 32 to move its rear flange portion 36 out of engagement with the vacuum valve seat 44. Vacuum is thereupon communicated with the rear side of the power piston C through the internal piston chamber 24 and piston passageway 68, and the piston C is caused to move rearwardly to displace fluid from the master cylinder A.

The servo-motor B is of a type adapted to provide "feel" or a reactive force opposing valve actuating movement to indicate to the operator the amount of force delivered by the unit. This is accomplished in the preferred embodiment by means of diaphragm 26 which divides the internal piston chamber 24 into forwardly and rearwardly opposed diaphragm chambers 72 and 74, respectively. The diaphragm 26 is designed to deliver its reactive force to the control member 46 in two stages. The first or initial stage of the diaphragm's reaction is produced by engagement of its center portion with the valve control member 46 and is intended to simulate the forces normally required to bring the brake shoes of an automotive vehicle into engagement with their brake drums. The second or major stage of the diaphragm's reaction is produced by the combined effect of the inner and outer portions of the diaphragm and is intended to provide a reaction generally proportional to the forces being delivered by the servo-motor. The diaphragm 26 is divided into its primary and secondary portions by means of a center plate 76 fastened to the back side of the diaphragm by means of an annular retaining ring 78 and throughrivets 80. The center portion of the diaphragm is provided with a centrally located button 82 biased into engagement with the valve control member 46 by means of a coil spring 84 interpositioned between the button and the center plate 76. Atmospheric pressure is continually communicated to the rearwardly positioned opposed diaphragm chamber 74 by piston passageway 86 and thence to the back side of the diaphragm's center portion by means of opening 88 in the center plate 76.

Initial rearward movement of the valve control member 46 causes the rear flange portion 36 of the annular sleeve 32 to be moved out of engagement with its seat 44, thereby admitting vacuum to the forwardly opposed diaphragm chamber 72 to produce a differential pressure across the diaphragm. A counter-reaction spring 90 of predetermined strength biases the center plate 76 into engagement with the rear surface of the internal piston chamber 24 to initially hold the center plate 76 out of engagement with the button 82. During the initial stage of pressure differential build-up across the diaphragm, only forces exerted on the center or primary portion of the diaphragm are transmitted through the button 82 to the valve control member 46. When sufficient vacuum has been introduced to the forwardly opposed diaphragm chamber 72 to overcome the effect of counter-reaction spring 90, however, center plate 76 moves into engagement with the diaphragm button 82 to produce a combined effect of both portions of the diaphragm.

It will be apparent from the above description that in the normal or de-energized condition of the servo-motor, full vacuum to atmospheric pressure differential is available to hold the rear flange portion 36 against its co-operating valve seat 44. It will further be apparent that upon energization of the servo-motor, pressure differential across this same portion, decreases, to diminish the sealing effect of the valve member upon its seat. This diminution of valve seating forces is counteracted in the present invention by means of utilization of reactive forces produced upon energization of the servo-motor. This is accomplished in the preferred embodiment by means of a plurality of L-shaped abutment levers 92 interpositioned between the control member 46 and the rear flange portion 36 of the valve closure member. The L-shaped levers 92 are supported side by side in the annular area between the members with their inner edges in abutment with shoulder 94 of the control member 46 and their outer edges retained within a laterally turned portion 96 on the rear flange 36. Reactive forces from the diaphragm 26 are transmitted through a plurality of rivets 98 extending through guide holes 100 in the guide plate 52 to bear against a load distribution washer 102 slidably supported on the valve control member 46 rearwardly of the L-shaped levers 92. The load distribution washer 102 abuts the L-shaped levers 92 intermediate their ends to thereby distribute the reactive load between the valve closure member 36 and the valve control member 46 in the amount desired.

While the invention has been described as embodying valving for a power operated master cylinder and the like and in which reaction produced from a diaphragm is utilized to help effect a valve seal, it is not so limited. Reactions produced by means other than diaphragms may be utilized, and the parts may be so positioned and constructed so as to require parts other than compression members to transmit the reactive forces from the diaphragm to the movable portion of the valve closure structure.

From the foregoing description of the preferred embodiment of the invention, it will be apparent that the objects heretofore enumerated as well as others have been accomplished. While the preferred embodiment has been shown and described in considerable detail, the invention is not limited to the particular construction shown and described, and it is my intention to cover hereby all adaptations, modifications, and uses thereof which come within the practice of those skilled in the art to which the invention relates.

I claim:

1. In valve means for controlling fluid pressure servo-motors and the like, a valve seat member, a movable valve closure member constructed and arranged to abut said valve seat member and thereby control differential pressure thereacross, reaction means arranged to provide a reactive force varying generally as a predetermined function of the output pressure of said valve means, and means for transferring at least a part of the reactive force of said reaction means to bias said members against each other to help effect a seal with respect to each other.

2. In valve means for controlling fluid pressure servo-motors and the like, a valve seat member, a movable valve closure member constructed and arranged to abut said valve seat member and thereby control differential pressure thereacross, reaction means arranged to increase its reactive force as the pressure differential across said members decreases, and means for transferring at least a part of the reactive force of said reaction means to bias said members against each other to help effect a seal with respect to each other.

3. In valve means for controlling fluid pressure servo-motors and the like, a valve seat, a movable valve closure member constructed and arranged to abut said valve seat and thereby control differential pressure thereacross, reaction means arranged to increase its reactive force as the pressure differential across said movable valve closure member decreases, and means for transferring at least a part of the reactive force of said reaction means to said movable valve closure member to bias said closure member against said valve seat and thereby help effect a seal with respect to said valve seat.

4. In valve means for controlling fluid pressure servo-motors and the like a valve seat member, a valve closure member constructed and arranged to abut said seat and thereby control differential pressure thereacross, one of said valve members being movable in a direction toward and away from said other valve member, a movable control member spaced apart from said movable valve member, lever means pivotally connected to said movable valve member and said control member, and reaction means arranged to provide a reactive force varying as a predetermined function of the output pressure of said valve means, said reaction means being operatively connected to said lever means in such manner as to distribute its force between said movable valve member and said control member.

5. In valve means for controlling fluid pressure servo-motors and the like, a valve seat, a movable valve closure member cooperating with said seat for controlling differential pressure thereacross, a movable valve control member spaced apart from said valve closure member, abutment means bearing against said valve closure member and said valve control member at spaced points and adapted to force said valve closure member against said seat, and reaction means arranged to increase its reactive force as the pressure differential across said valve closure member decreases; said reaction means bearing against said abutment means intermediate said spaced points to force said valve closure member against said valve seat.

6. In valve means for controlling fluid pressure servomotors and the like, an annular valve seat, an annular valve closure member the outer edges of which cooperate with said seat for controlling differential pressure thereacross, a movable valve control member positioned radially inwardly of said annular valve closure member, at least one abutment lever bearing against valve closure member and said valve control member at spaced points and adapted to force said valve closure member against said seat, and reaction means arranged to increase its reactive force as the pressure differential across said valve closure member decreases, said reaction means bearing against said lever between said spaced points to force said valve closure member into engagement with said valve seat.

References Cited in the file of this patent
UNITED STATES PATENTS

| | | |
|---|---|---|
| 2,685,170 | Price | Aug. 3, 1954 |
| 2,690,740 | Hupp | Oct. 5, 1954 |
| 2,779,314 | Vorech | Jan. 29, 1957 |